United States Patent
Hannert et al.

[11] Patent Number: 5,783,015
[45] Date of Patent: Jul. 21, 1998

[54] METHOD OF MAKING VEHICLE HEADREST HAVING CLOTH FACE BONDED TO PLASTIC SHELL

[75] Inventors: Lynn F. Hannert, Harrison; Timothy F. O'Brien, White Lake, both of Mich.

[73] Assignee: UT Automotive Dearborn, Inc., Dearborn, Mich.

[21] Appl. No.: 532,370

[22] Filed: Sep. 22, 1995

[51] Int. Cl.[6] .................................. B32B 31/18
[52] U.S. Cl. .................... 156/213; 156/267; 156/293; 156/308.2
[58] Field of Search .................... 156/213, 228, 156/251, 291, 380.7, 380.8, 248, 267, 293, 308.2; 297/391, 396

[56] References Cited

U.S. PATENT DOCUMENTS

| | | | |
|---|---|---|---|
| 4,352,709 | 10/1982 | Urai et al. | 156/380.8 |
| 4,619,725 | 10/1986 | Muraishi et al. | 156/228 |
| 4,719,136 | 1/1988 | Zwirner. | |
| 5,004,572 | 4/1991 | Kurimoto. | |
| 5,028,294 | 7/1991 | England | 156/251 |
| 5,080,749 | 1/1992 | Moriya et al. | 156/251 |
| 5,089,191 | 2/1992 | Hughes. | |
| 5,098,270 | 3/1992 | Rohn. | |
| 5,165,754 | 11/1992 | Louys. | |
| 5,294,278 | 3/1994 | Matsui et al. | 156/248 |
| 5,425,836 | 6/1995 | Shimada et al. | 156/213 |
| 5,462,786 | 10/1995 | Van Ert | 156/212 |
| 5,478,136 | 12/1995 | Takeuchi et al. | 297/391 |

*Primary Examiner*—Richard Crispino
*Attorney, Agent, or Firm*—Howard & Howard

[57] ABSTRACT

An improved vehicle headrest includes a bead between a plastic sleeve and a cloth facing. The cloth is bonded to the plastic sleeve such that an exposed face of the cloth is quickly and reliably connected to the plastic sleeve. The plastic sleeve is then filled with a foam and a positioning post. The inventive headrest is formed by initially placing the cloth material on positioning structure in an anvil. The plastic sleeve has been previously rotationally molded, and is slid onto the anvil and over the cloth material. A dielectric bar is then brought into contact with the plastic sleeve, and a bead is formed. As the bead is formed, a cutting blade cuts the plastic material inwardly of the bead. The cut portion of the sleeve is removed exposing the cloth material. A "RF" compatible barrier layer is formed on a rear face of the cloth material and prevents foam from reaching the exposed forward face.

9 Claims, 2 Drawing Sheets

_5,783,015_

METHOD OF MAKING VEHICLE HEADREST HAVING CLOTH FACE BONDED TO PLASTIC SHELL

BACKGROUND OF THE INVENTION

This invention relates to a method of bonding a cloth facing material to a plastic shell.

In the prior art, vehicle trim components such as headrests are typically formed from a plastic shell filled with a foam material. To provide comfort, and to improve appearance, a cloth facing is often placed on the plastic shell. In the past, the cloth facing has often been stitched to the plastic shell.

It is known to mold the shell by various plastic molding techniques. Typically, a one-piece shell has been formed, and then a cutting step has been required to cut a portion of the shell on a forward face away from the remainder of the shell. A cloth material is then inserted into the cut-away portion opening, and secured to the shell. In the prior art, the cloth has been stitched to the plastic shell. The above-described method steps have been relatively labor intensive. Thus, it would be desirable to develop a method of attaching the cloth facing to the plastic that is more conducive to production manufacture than stitching.

In the past, dielectric bonding has been utilized to attach plastic surfaces to cloth surfaces. For the most part, these efforts have been directed to attaching webs or sheets of plastic to sheets of cloth material. Thus, the prior art methods have not had wide usage, as they are limited in practical applications.

SUMMARY OF THE INVENTION

In a disclosed embodiment of this invention, a component includes a plastic shell bonded to a cloth facing material. In one embodiment, the cloth material has a barrier layer at a rear face facing inwardly of the shell. The shell is filled with a foam material after the cloth is attached, and the barrier layer prevents the foam from bleeding through to the cloth.

In one preferred embodiment of this invention, the component is a headrest. A post for mounting the headrest to a seat is positioned within the shell prior to the shell being filled with foam. Preferably, the cloth material is a body cloth that match the material on the seat that receives the head rest. A foam layer is laminated to the cloth. Alternatively, aspects of this invention might extend to bonding a leather facing material to the shell.

In other aspects of this invention, the cloth material is bonded to the inside edge of an opening in the shell. Thus, a secure connection is provided, and a bond bead surrounds the cloth in the component. The dielectric bonding bar is modified to give the bond bead a desired appearance. As one example, the bead could appear as a stitch to give the impression that the cloth is stitched to the shell.

In one preferred method of forming the inventive component, the shell is formed in a rotational molding technique. The shell consists of a forward face, a rear face, top and bottom ends and two sidewalls. The bottom end is either molded to be pivotable relative to the other walls, or is cut such that it may be pivoted. A cloth blank is initially placed on an anvil. Positioning jigs on the anvil position the cloth blank at a desired location. The shell is then slid onto the anvil over the cloth blank. The front face of the shell overlies the cloth blank. The dielectric bar is then brought downwardly on top of the shell and on the front face. The bar forms the bond bead bonding the shell to the cloth. At the same time, a cutting edge cuts the shell material inwardly of the bead. When the cut portion of the shell is removed, the underlying cloth is exposed. In this way, a headrest having a cloth material bonded to a plastic shell is quickly and reliably formed. A worker of ordinary skill in the art would be capable of designing the details of the dielectric bonding process.

These and other features of the present invention can be best understood from the following specification and drawings, of which the following is a brief description.

DETAILED DESCRIPTION OF THE PREFERRED EMBODIMENT

Figure 1:
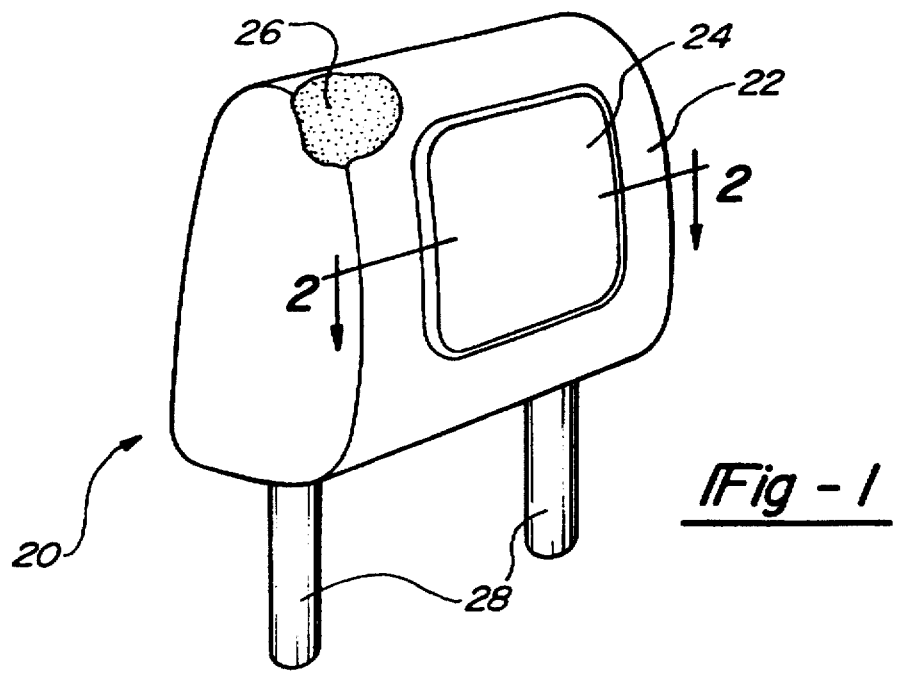
FIG. 1 is a perspective view of a vehicle headrest according to the present invention.

Improved headrest 20 is illustrated in FIG. 1. A plastic shell 22 has a forward face receiving a cloth facing 24. The cloth is selected to be comfortable, and to provide a pleasing appearance for the headrest 20. Preferably, a woven material as used in other headrest applications is selected. As shown in the cutaway portion of FIG. 1, a foam material 26 fills shell 22. Posts 28 extend outwardly of a bottom end of shell 22.

Figure 2:
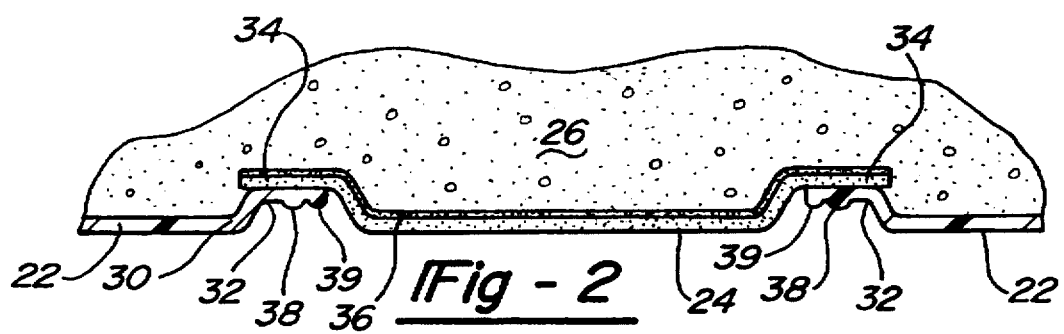
FIG. 2 is a cross-sectional view along line 2—2 as shown in FIG. 1.

As shown in FIG. 2, the cloth material 24 is secured to edges 30 of the forward face of shell 22 by a bead 32. Bead 32 extends inwardly from the nominal surface of the edge 30 to be secured to an ear 34 on the cloth material 24. As shown, a polyurethane barrier material 36 is attached behind the cloth material 24. A foam layer 34 is formed between the cloth material 24 and the barrier 36. The polyurethane barrier material is formed of a thickness less than 1 percent of the thickness of the combined cloth and foam layers, and more preferably about 0.5 percent of the thickness of the layers. In one example, the cloth material had a thickness of between 1.5/2.0 mms, the foam layer had a thickness of between 9.5 and 12.7 mm. and the barrier material had a thickness of 0.063 mm. The shell had a nominal thickness of between 1.0/1.5 mm. Preferably the barrier material is a polyurethane film available under the trade name "Dureflex" and available from Deerfield Urethane, Inc. of South Deerfield, Mass. The foam layer is preferably a polyurethane supplied by Foamex International, and the cloth layer is preferably a non stretch woven material available under the trade name "Quantum" by Milliken.

As an alternative to the polyurethane barrier layer, a closed cell polyester spun bonded barrier layer available from Reemey of Detroit, Mich. may be utilized. One preferred layer had a weight of 3 oz/square yard. Also, another possible barrier layer is available as a polypro F.P. from Acme Mills Co. of Detroit, Mich., under the trade name DUON.

Further as stated above, the cloth material is preferably a body cloth selected to match the other cloth surfaces in the vehicle. If the vehicle is made with a leather upholstery, then the material may also be leather.

Preferably, the cloth should be "RF" compatible. Also, the barrier layer is preferably "RF" compatible.

As shown, the foam 26 extends upwardly against the barrier material 36. The barrier material 36 prevents the foam material 26 from bleeding through the foam 34 and cloth 24. If the foam bleeds through the foam 34 and the cloth 24, then the cloth material will be undesirably hard, and not comfortable to the touch, feel or use.

As also shown in FIG. 2, a design 38 may be formed at the bead 32. Design 38 can be selected to resemble a stitch to give the appearance that the cloth 24 is stitched to the shell 22. The design 38 is achieved by the dielectric bonding process, as will be explained below. The bead 32 also includes a welt 39 at an inner end.

Figure 3:
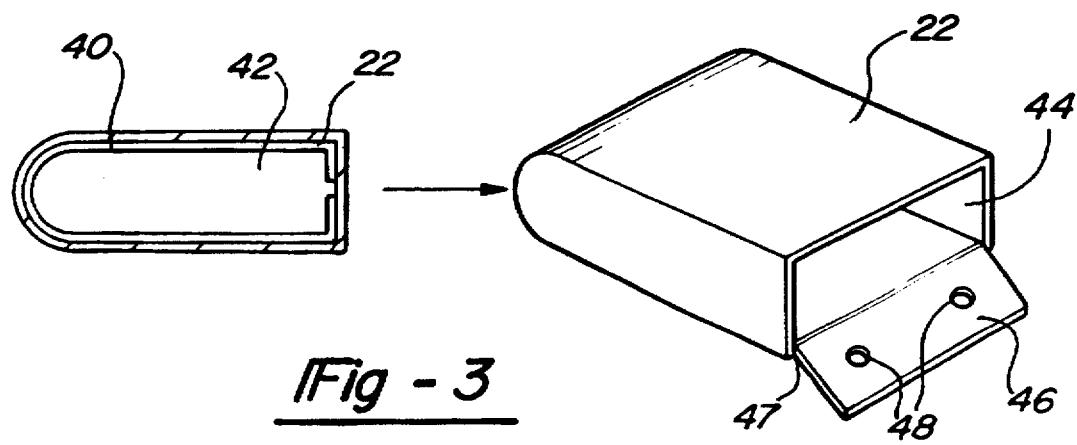
FIG. 3 shows a first step in the method of forming the inventive headrest.

As shown in FIG. 3, the shell 22 is formed in a rotational mold 40. As is known, dry powder is deposited into a mold cavity 42, and the mold is heated and rotated. Preferably, shell 22 is formed of PVC. Centrifugal force throws the plastic material outwardly against the sides of the cavity 42, and the shell 22 is thus formed. As also shown in FIG. 3, the shell 22 as formed from the mold 40 includes a hollow interior space 44. A bottom end 46 of shell 22 is attached at a hinge 47 to the remainder of the shell. Openings 48 for the post 28 may also be formed. The bottom end 46 may be formed to be pivotable relative to the remainder of the shell in the mold, or may be cut such that it may be pivoted once shell 22 is removed from mold 40.

Figure 4:
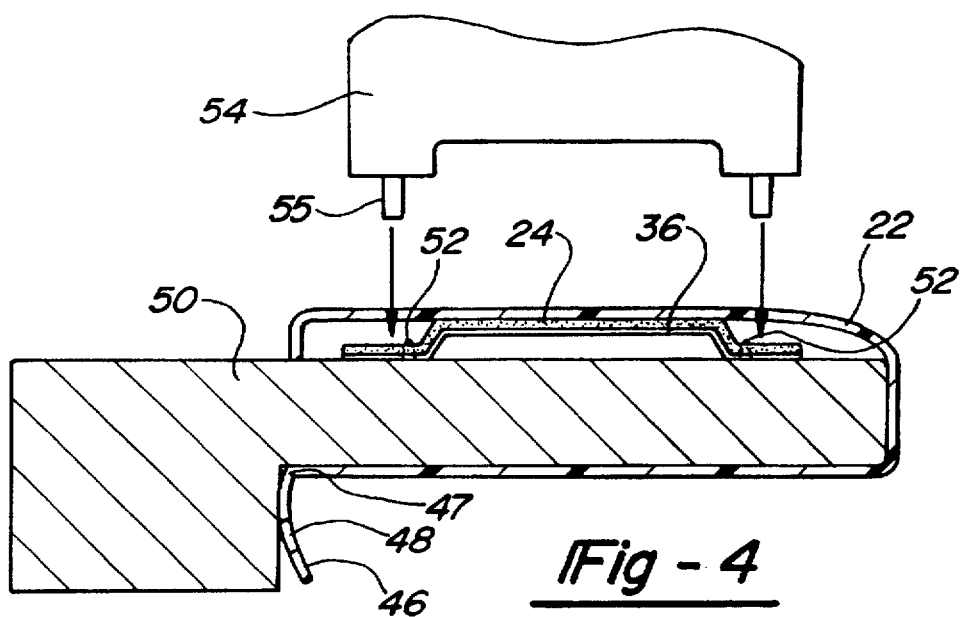
FIG. 4 shows a step subsequent to that shown in FIG. 3.

Once the shell 22 is molded, FIG. 4 shows the next step in forming the inventive headrest 20. A dielectric anvil 50 incorporates positioning jig pins 52. The cloth 24 is positioned on pins 52, such that the cloth is at a desired position relative to the anvil 50. The shell 22 is then slid onto anvil 50, by pivoting the bottom end 46 away from the remainder of the shell, as shown.

The dielectric press 54, preferably performs the entirety of the bonding in a single pass. Bar 55 is brought downwardly into contact with the shell 22. The bar 55 is one electrode and is supplied with current. Anvil 50 is insulated and provides support for the electrode.

As shown, the shell 22 initially has a relatively planar forward face. The bead 32 as found in the final headrest 20 is formed by the bar 55 which outlines a portion of the shell. The bar 55 may have contact surfaces that have a shape to result in the desired pattern, such as pattern 38. The bar 55 is brought into contact with the shell 22, and the bead is then made. The combined cloth 24 and shell 22 may then be removed from the anvil 50.

By comparing FIGS. 4 and 2 it can be seen that the shell forward face is generally planer and overlays a central portion of the cloth 24. The cloth 24 has outer portions spaced further from the forward face of the shell than the central portions. As can be seen in FIG. 4, when the shell is first placed on the anvil, the forward face is in contact with the central portion of the shell, but spaced from the outer portions. As shown in FIG. 2, the forward face is brought rearwardly beyond the central portion of the cloth to be secured to the outer portions at the bead.

Figure 5:
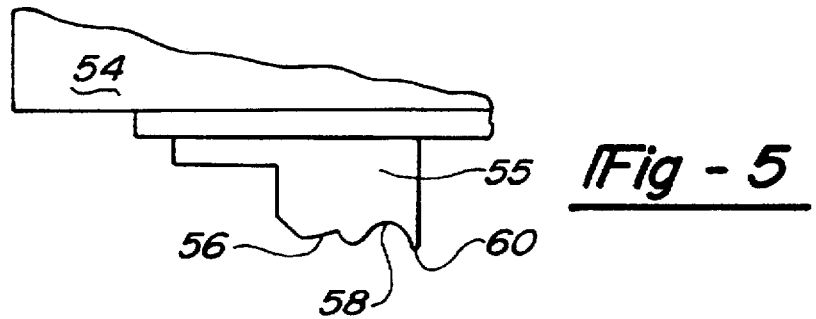
FIG. 5 shows a detail of a bonding tool.

A detail of dielectric bar 55 is shown in FIG. 5. As shown, a surface 56 may be formed in the bar to form the pattern 38 as a stitch embossment. The welt 39 is formed by a welt embossment 58. The surface of the bar 55 which contacts the shell 22 may be tailored to achieve the desired visual effect on the final bead 32. As shown, a cutting blade 60 is formed on an inner end of the bar 55. When the bead 32 is being formed, the cutting blade 60 cuts the plastic material. The downward movement of the ram is controlled such that cutting blade 60 cuts the plastic, but does not cut the cloth.

Figure 6:
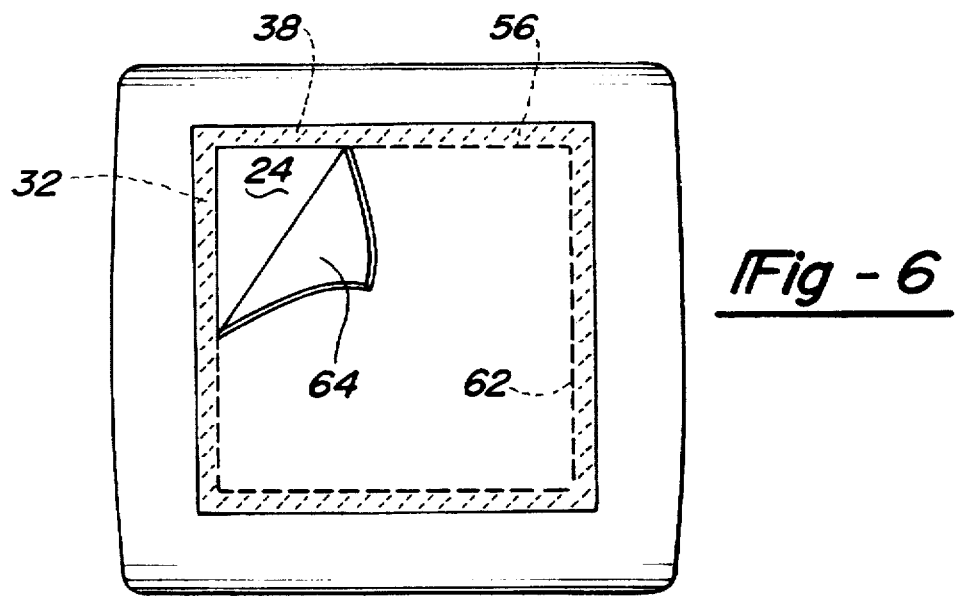
FIG. 6 shows yet another subsequent step in the formation of the headrest according to the present invention.

As shown in FIG. 6, blade 60 cuts at line 62 the portion 64 of the shell 22 interior of the bead 32. This portion 64 may thus be removed from the final headrest 20. As shown also, the pattern 38 left on the bead 32 may resemble a stitch, or any other desired visual effect.

The combined shell and cloth is then filled with a foam material. Preferably, the posts 28 are inserted into the shell 22 prior to the foam.

The disclosed invention improves upon the prior art in that a production bonding assembly may be utilized to provide a quality connection between a plastic shell and the cloth blank. The resulting headrest has excellent appearance and comfort features.

Although a preferred embodiment of this invention has been disclosed, a worker of ordinary skill in the art would recognize that certain modifications would come within the scope of this invention. For that reason, the following claims should be studied to determine the true scope and content of this invention.

We claim:

1. A method of forming a component comprising the steps of:
    (i) forming a plastic shell having a hollow interior space between forward and rear faces;
    (ii) placing a cloth laminate in the interior space between said forward and rear faces of said shell such that at least a portion of a forward face of said cloth contacts said forward face of said shell;
    (iii) while maintaining said contact, bonding a portion of said forward face of said shell to said cloth laminate along a bead thereby outlining a shell portion, and removing said shell portion within said bead to expose said cloth face; and
    (iv) filling said shell with foam.

2. A method as recited in claim 1, wherein a positioning post is placed within said shell prior to step (iv), said positioning post being secured within said shell by said foam, and said component being utilized as a vehicle head rest.

3. A method as recited in claim 2, wherein said cloth material being provided with a barrier on a rear face to prevent foam from bleeding through to said forward face of said cloth.

4. A method as recited in claim 1, wherein said bonding of step (iii) includes the sub-steps of placing said cloth material on a positioning structure on an anvil, then placing said shell on said anvil, then bringing a dielectric bonding bar into contact with said shell to form said bead.

5. A method as recited in claim 4, wherein said shell being provided with an opening at one end between said forward and rear faces, and said opening being used for placing said shell on said anvil and over said cloth material.

6. A method as recited in claim 1, wherein said plastic shell forward face being generally planar prior to step (iii).

7. A method as recited in claim 6, wherein said forward face of said cloth laminate has a generally central portion in contact with said forward face of said shell, said bead being formed at a recessed portion of said cloth laminate spaced away from said forward face of said shell prior to step (iii), and such that said formation of said bead includes forcing a portion of said generally planar forward face of said shell beyond said cloth central portion to contact said recessed portion of said cloth material and such that the final configuration of said forward face of said shell is non-planar.

8. A method for forming a component comprising the steps of:
    (i) forming a plastic laminate having a generally planar face;

(ii) providing a layer of cloth, placing said plastic laminate so as to overly said cloth such that a portion of said laminate is in contact with a generally central portion of said cloth;

(iii) while maintaining said contact, bonding a portion of said plastic laminate to said cloth laminate to form a bead surrounding said generally central portion, and cutting and removing said plastic laminate inwardly of said bead to reveal said central portion of said cloth.

9. A method as recited in claim 8, wherein the formation of said bead in step (iii) includes the step of forcing said plastic laminate around said central portion of said cloth beyond said central portion to contact a recessed portion of said cloth, said bead being formed at said removed portion, said recessed portion being spaced further from said plastic laminate planar face relative to said central portion of said cloth prior to step (iii).

* * * * *

UNITED STATES PATENT AND TRADEMARK OFFICE
CERTIFICATE OF CORRECTION

PATENT NO. : 5,783,015
DATED : July 21, 1998
INVENTOR(S) : Lynn F. Hannert and Timothy F. O'Brien It is certified that error appears in the above-indentified patent and that said Letters Patent is hereby corrected as shown below:

Claim 9, line 5, cancel "removed" and insert --recessed--.

Signed and Sealed this

Twenty-third Day of February, 1999

Attest:

Q. TODD DICKINSON

*Attesting Officer*  *Acting Commissioner of Patents and Trademarks*